United States Patent
Mai et al.

(10) Patent No.: US 8,979,371 B2
(45) Date of Patent: Mar. 17, 2015

(54) SLIDE COVER LINKING MECHANISM WITH BOTH PUSH AID EFFECT AND END BUFFERING EFFECT

(75) Inventors: Chien Cheng Mai, Taipei County (TW); Way Han Dai, Taipei County (TW); Chien Nan Tsai, Taipei County (TW)

(73) Assignee: First Dome Corporation, Taipei County (TW)

( * ) Notice: Subject to any disclaimer, the term of this patent is extended or adjusted under 35 U.S.C. 154(b) by 1035 days.

(21) Appl. No.: 13/049,996

(22) Filed: Mar. 17, 2011

(65) Prior Publication Data

US 2012/0238332 A1 Sep. 20, 2012

(51) Int. Cl.
*F16C 29/00* (2006.01)
*H04M 1/02* (2006.01)

(52) U.S. Cl.
CPC .................................. *H04M 1/0237* (2013.01)
USPC ...................... 384/10; 455/575.4; 361/679.01

(58) Field of Classification Search
USPC ....................... 384/10; 361/679.01; 455/575.4
See application file for complete search history.

(56) References Cited

U.S. PATENT DOCUMENTS

| | | | |
|---|---|---|---|
| 2010/0099467 A1* | 4/2010 | Lee | 455/575.4 |
| 2010/0128422 A1* | 5/2010 | Zhou et al. | 361/679.01 |
| 2010/0129010 A1* | 5/2010 | Jo | 384/10 |
| 2011/0222799 A1* | 9/2011 | Wang | 384/10 |

* cited by examiner

*Primary Examiner* — Thomas R. Hannon
(74) *Attorney, Agent, or Firm* — Rosenberg, Klein & Lee

(57) ABSTRACT

A slide cover linking mechanism with both push aid effect and end buffering effect includes: a seat body having a receiving space and at least one first slide guide section, at least one second slide guide section with a middle turning section being disposed in the receiving space; a slide seat slidable along the first slide guide sections and formed with a receiving recess in which a third slide guide section is disposed; at least one first elastic member two ends of which are respectively pivotally connected in the receiving space and with a middle section of the slide seat; and at least one second elastic member two ends of which are respectively connected in the receiving recess and with a slide guide member slidable within the third slide guide section. A movable member movable along the second slide guide section is pivotally connected on the slide guide member.

59 Claims, 7 Drawing Sheets

SLIDE COVER LINKING MECHANISM WITH BOTH PUSH AID EFFECT AND END BUFFERING EFFECT

BACKGROUND OF THE INVENTION

1. Field of the Invention

The present invention relates generally to a slide cover linking mechanism with both push aid effect and end buffering effect, and more particularly to a slide cover linking mechanism, which provides a push strength saving and slide buffering/protection effect.

2. Description of the Related Art

Following the rapid advance of various portable electronic products, all kinds of slide cover linking structures have been continuously developed. For example, Taiwanese Patent Publication No. I208031 discloses a slide cover device, Publication No. M297113 discloses a slidable pivot device, and Publication No. M379940 discloses an elastic unit of slide cover device. These patents provide slide cover linking structures for easily pushing the slide covers to semiautomatically open/close the slide covers. However, there are only few patents for providing buffering or damping effect at the final stage of the sliding travel. Some designs simply provide elastic elements at the end for achieving buffering effect. Such elastic elements only provide very short buffering travel. As a result, at the final stage of the opening/closing travel of the slide cover, a violent deceleration is likely to take place. Under such circumstance, the slide cover is frequently impacted. This will affect the assembling stability of the relevant components or even lead to damage to the components.

To overcome the above problem, Taiwanese Patent Publication No. 200950462 discloses an electronic device with slide cover buffering function. The device includes a main body and a slide cover slidable on the main body. A buffering unit is additionally disposed between the main body and the slide cover. When the slide cover slides relative to the main body, the buffering unit serves to provide a resistance against the sliding of the slide cover for slowing down the sliding speed thereof. Such structure somewhat is able to avoid improper impact of the slide cover to the product due to high-speed sliding and sudden stop. However, the structure also acts as an obstacle to the drive of the slide cover. As a result, a user needs to exert a greater force to the slide cover in operation (for driving the slide cover as well as overcoming the resistance of the buffering unit). Therefore, the user can hardly conveniently use the electronic product.

SUMMARY OF THE INVENTION

It is therefore a primary object of the present invention to provide a slide cover linking mechanism with both push aid effect and end buffering effect. The slide cover linking mechanism is applicable to large-size electronic product for driving the slide cover thereof.

At the end of the opening/closing travel of the slide cover, the slide cover linking mechanism can provide a buffering effect to avoid impact to the slide cover due to excessively great driving force and instantaneous change thereof. Therefore, the possibility of damage to relevant components can be minimized.

It is a further object of the present invention to provide the above slide cover linking mechanism with both push aid effect and end buffering effect. With the slide cover linking mechanism, the slide cover can be more smoothly opened/closed to promote competitive ability of the product.

To achieve the above and other objects, the slide cover linking mechanism with both push aid effect and end buffering effect of the present invention includes: a seat body having a receiving space and at least one first slide guide section, at least one second slide guide section being disposed in the receiving space, a turning section being disposed at the middle of the second slide guide section; a slide seat bridged over the receiving space, the slide seat having at least one connection section for assembling with the first slide guide section, whereby the slide seat can slide over the receiving space along the first slide guide sections, the slide seat being formed with a receiving recess near the second slide guide section, a third slide guide section being disposed on the receiving recess and extending toward the turning section; at least one first elastic member, a first end of the first elastic member being pivotally connected with a section in the receiving space near the turning section, a second end of the first elastic member being pivotally connected with a middle section of the slide seat, whereby the first elastic member serves to apply a force to the slide seat for driving the slide seat to slide toward two end sections of the second slide guide section; and at least one second elastic member for providing an elastic force smaller than that of the first elastic member in operation, a first end of the second elastic member being located in the receiving recess, a second end of the second elastic member being connected with a slide guide member slidable within the third slide guide section, a movable member being further pivotally connected on the slide guide member, the movable member being movable along the second slide guide section.

In the above slide cover linking mechanism with both push aid effect and end buffering effect, the seat body has two first slide guide sections disposed on two sides of the receiving space. The two first slide guide section extend in parallel to each other.

In the above slide cover linking mechanism with both push aid effect and end buffering effect, two second slide guide sections are symmetrically disposed in the receiving space corresponding to the two first slide guide sections.

In the above slide cover linking mechanism with both push aid effect and end buffering effect, two receiving recesses are disposed on two sides of the slide seat near the second slide guide sections. An assembling member is connected in each receiving recess. A third slide guide section is disposed on the assembling member. The third slide guide section extends toward the turning section.

The present invention can be best understood through the following description and accompanying drawings, wherein:

DETAILED DESCRIPTION OF THE PREFERRED EMBODIMENTS

Figure 1:
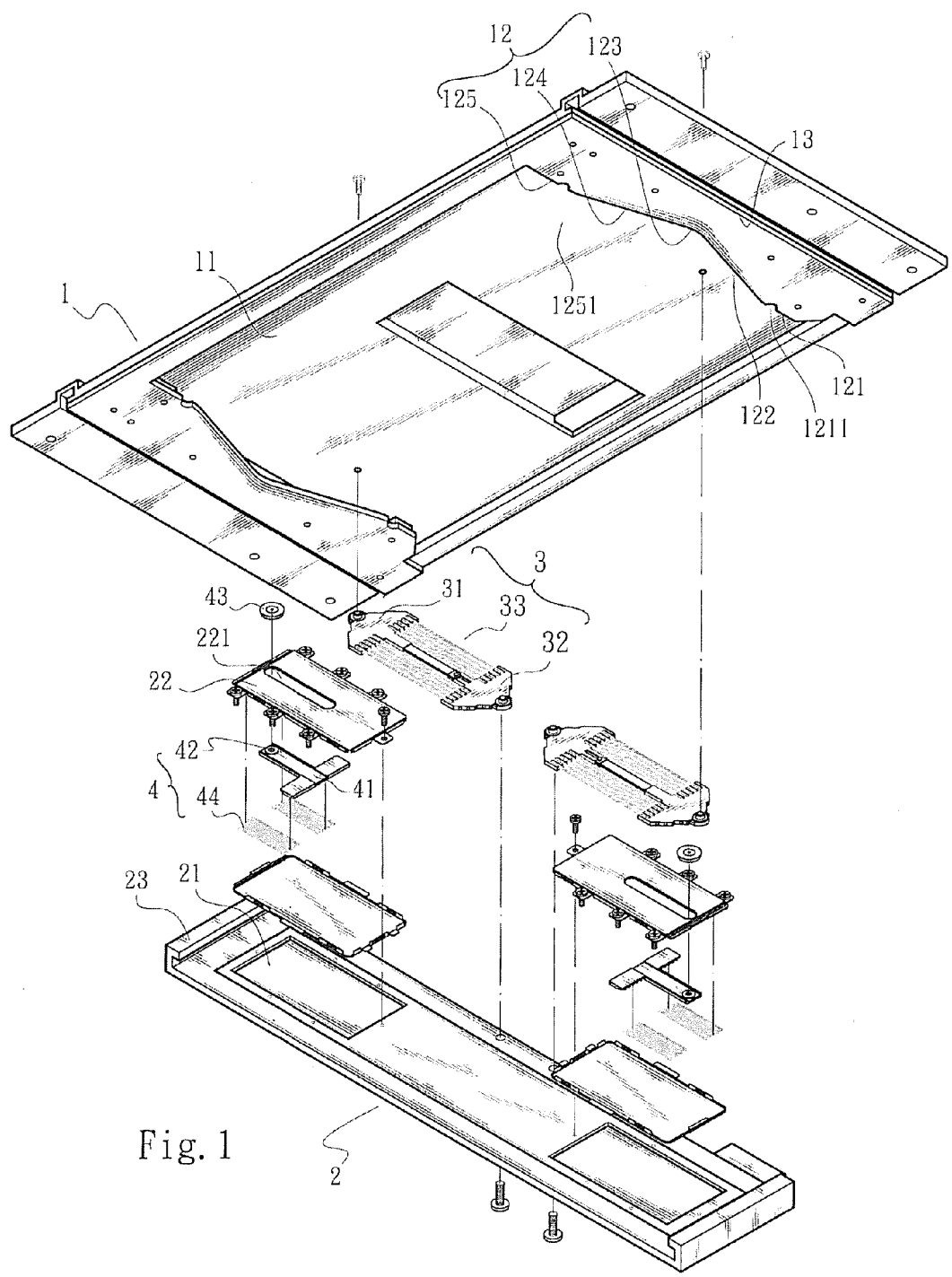
FIG. 1 is a perspective exploded view of the present invention.
Figure 2:
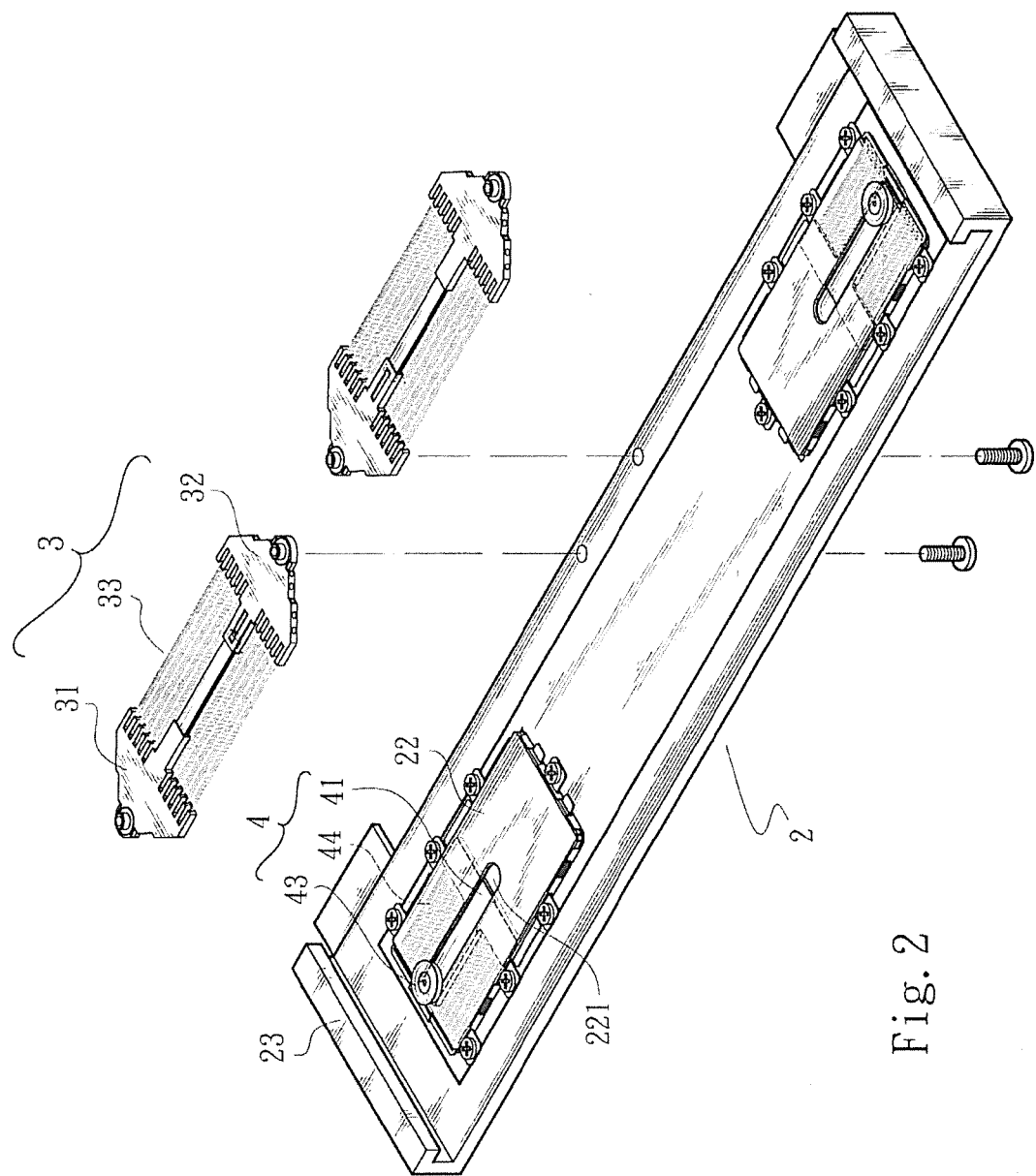
FIG. 2 is a perspective partially assembled view of the first and second elastic members and the slide seat of the present invention.
Figure 3:
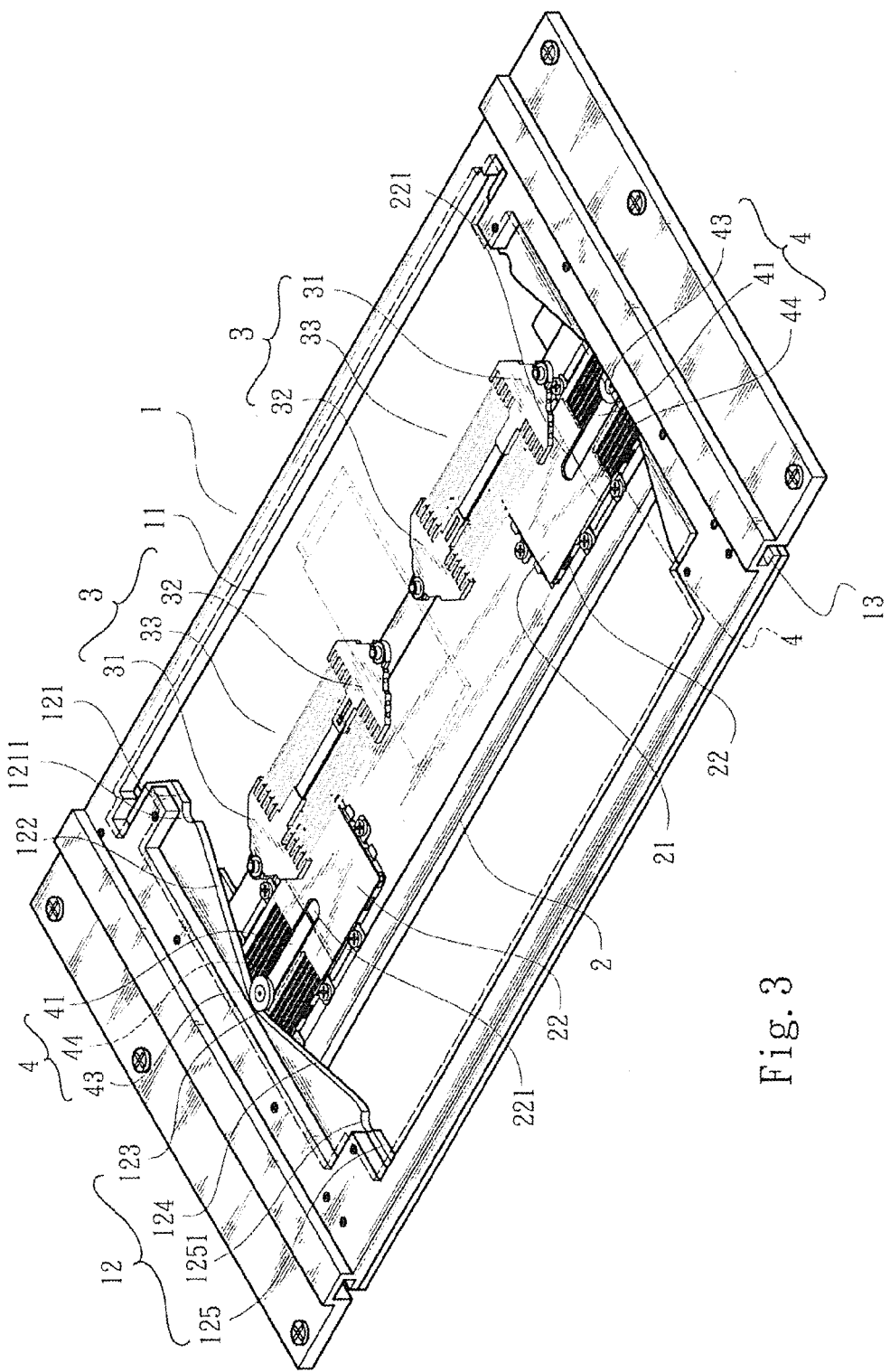
FIG. 3 is a perspective assembled view of the present invention, in which the seat body is partially removed for easy illustration.

Please refer to FIGS. 1 to 3. The present invention includes a seat body 1, a slide seat 2, a first elastic member 3 and a second elastic member 4. The seat body 1 is formed with a receiving space 11 and at least one first slide guide section 13. At least one second slide guide section 12 is disposed in the receiving space 11. According to a preferred embodiment as shown in the drawings, two first slide guide sections 13, (which can be recessed slide channels), are disposed on two sides of the receiving space 11. The first slide guide sections 13 extend in parallel to each other. In addition, two second slide guide sections 12 are respectively disposed on two sides of the receiving space 11. The second slide guide sections 12 can be transverse lateral guide rails. A turning section 123 is disposed at the middle of at least one of the second slide guide sections 12. In the drawings, the turning section 123 has the form of a gradually turning section. Due to the turning sections 123, the distance between the two second slide guide sections 12 is gradually changed. Two oblique sections 122, 124 are respectively interconnected between two end sections 121, 125 of the second slide guide section 12 and the turning section 123 thereof. In addition, two locating notches 1211, 1251 are respectively disposed on the two end sections 121, 125. The slide seat 2 is bridged over the receiving space 11. At least one connection section 23 is disposed on the slide seat 2 for assembling with the first slide guide section 13. In the drawings, two connection sections 23 are disposed on two sides of the slide seat 2 corresponding to the first slide guide sections 13 (slide channels). The connection sections 23 can be hook sections adapted to the slide channels, whereby the connection sections 23 can extend into the first slide guide sections 13 and connect therewith. Accordingly, the slide seat 2 can slide over the receiving space 11 along the first slide guide sections 13. In addition, the slide seat 2 is formed with two receiving recesses 21 near the second slide guide sections (lateral guide rails). An assembling member 22 is connected in each receiving recess 21. The assembling member 22 is composed of two cover sheets mated with each other. A third slide guide section 221, (which can be a guide slot), is disposed on each assembling member 22. The third slide guide section 221 extends toward the turning section 123. In the drawings, the first elastic member 3 is composed of multiple springs 33 and two elastic supports 31, 32 fitted with each other. First ends and second ends of the springs 33 are respectively connected with the elastic supports 31, 32. A first end of the first elastic member 3 (with the elastic support 31) is pivotally connected in the receiving space 11 in a position beside the turning section 123. A second end of the first elastic member 3 (with the elastic support 32) is pivotally connected with a middle section of the slide seat 2. The second elastic member 4 is an elastic body, which can provide an elastic force smaller than that of the first elastic member 3.

In the drawings, the second elastic member 4 is composed of multiple springs 44 and a T-shaped slide guide support 41. First ends of the springs 44 are fixed in the assembling member 22. Second ends of the springs 44 are connected on the T-shaped slide guide support 41. The slide guide support 41 is further connected with a slide guide member 42, which can slide within the third slide guide section 221 (guide slot). The slide guide member 42 is further pivotally connected with a movable member 43, which can move on the second slide guide section 12. The movable member 43 can be a roller.

Figure 4:
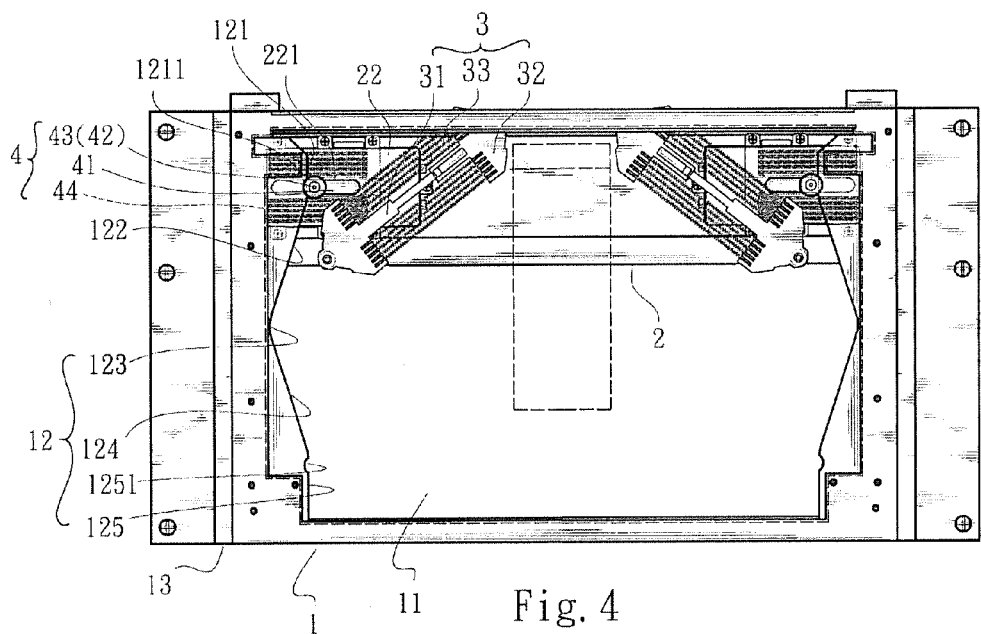
FIG. 4 shows the operation of the present invention in a first state.
Figure 5:
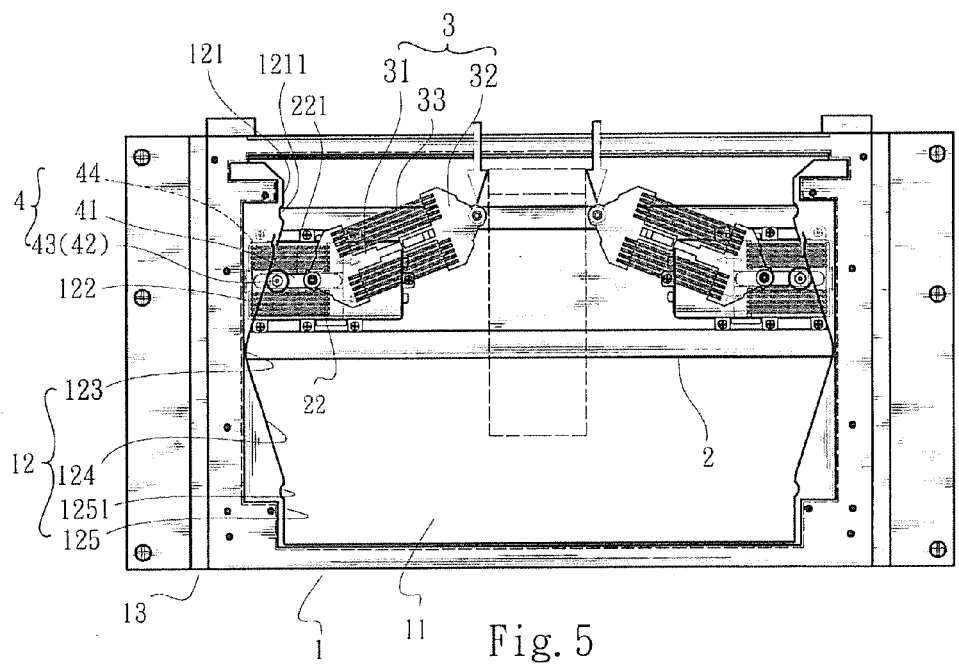
FIG. 5 shows the operation of the present invention in a second state.
Figure 6:
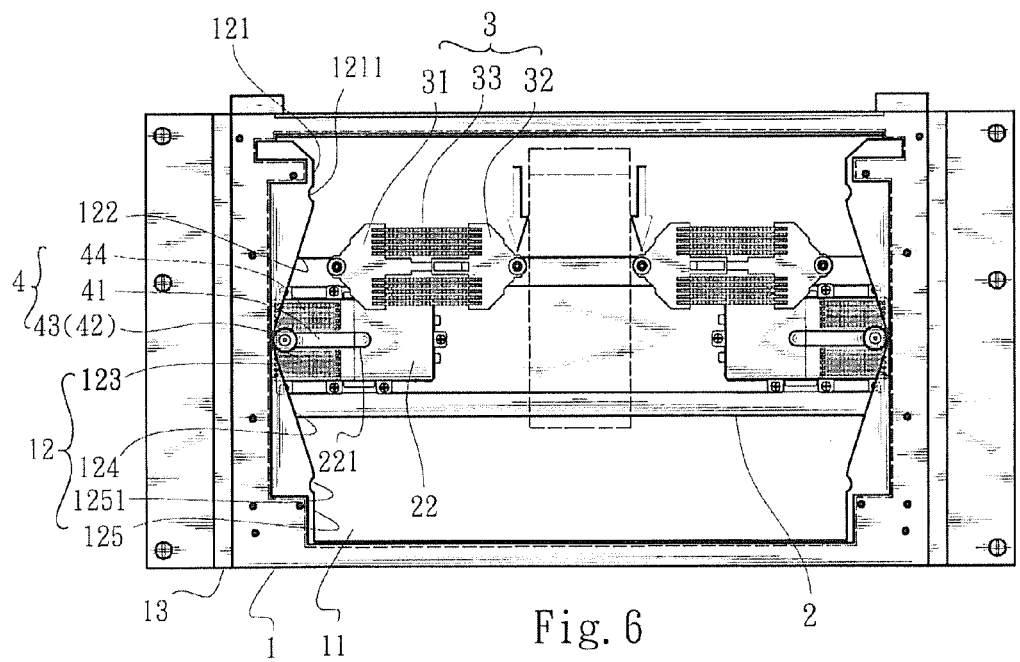
FIG. 6 shows the operation of the present invention in a third state.
Figure 7:
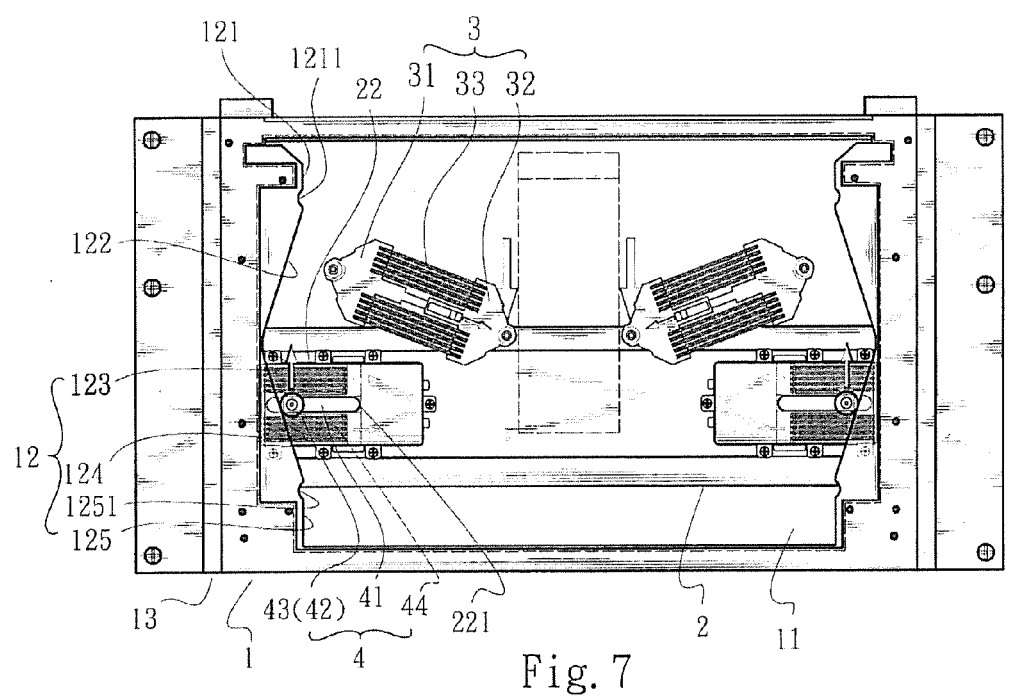
FIG. 7 shows the operation of the present invention in a fourth state.
Figure 8:
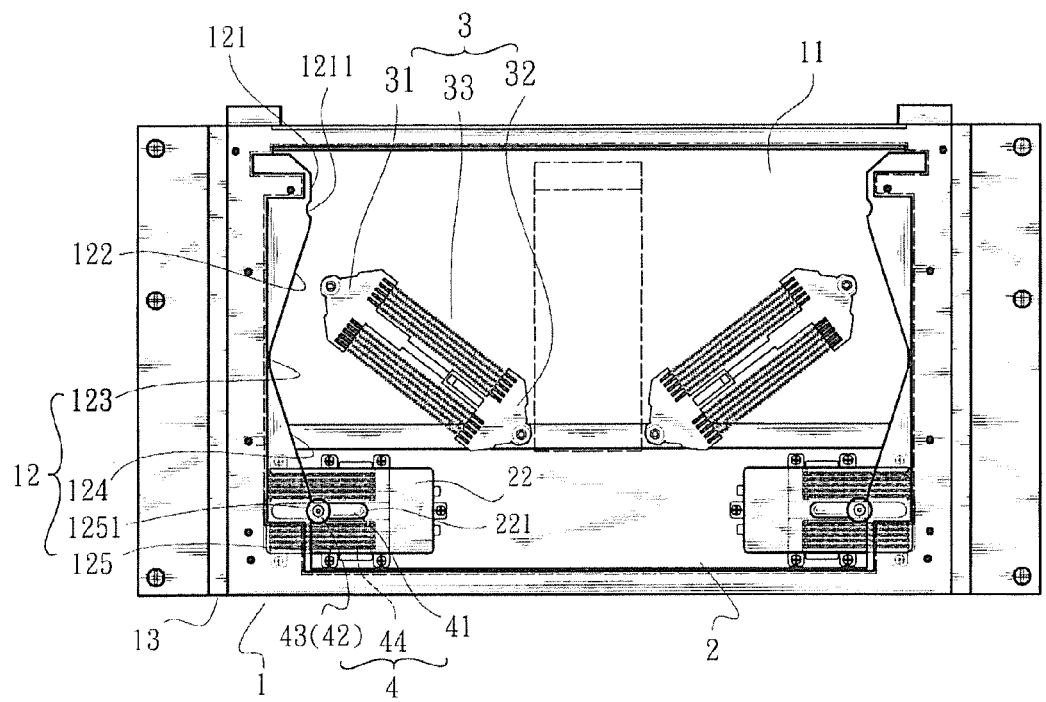
FIG. 8 shows the operation of the present invention in a fifth state.

Please now refer to FIGS. 4 to 8. In practice, the seat body 1 is connected on a base (or a casing) of an electronic product, while the slide seat 2 is connected with a slide cover of the electronic product. In operation, when a user pushes and opens the slide cover, the slide seat 2 is drivingly slid over the receiving space 11. When the slide seat 2 starts to move from the starting end section 121 to the other end section 125, the first elastic member 3 is gradually compressed from an initial uncompressed state to store energy. At the same time, the second elastic member 4 is gradually contracted with the first elastic member 3 from an initial extended state (to release energy). At this time, the slide guide member 42 is driven to slide along the third slide guide section 221 (guide slot). Accordingly, the slide guide member 42 drives the movable member 43 (roller) to leave the locating notch 1211 of the starting end section 121 and roll along the oblique section 122 into the turning section 123 (as shown in FIGS. 4 to 6). In the turning section 123, the first elastic member 3 is in a maximum compressed (energy storage) state, while the second elastic member 4 is in a maximum contracted (energy release) state. During this process, the second elastic member 4 applies a contraction pull force to the slide guide member 42, whereby the slide guide member 42 slides toward the turning section 123. At this time, the slide seat 2 is pushed in a direction of the slide movement. Accordingly, a force is provided to help in compressing the first elastic member 3 to save the strength of an operator for pushing and opening the slide cover (slide seat 2). After the movable member 43 (roller) rolls to a position over the turning section 123, the first elastic member 3 starts to gradually uncompressed (release energy) to apply a push force to the slide seat 2 (slide cover) for driving the slide seat 2 (slide cover) to further slide. At this time, the oblique section 124 will provide a stop effect for the rolling of the movable member 43 (roller) and urge the slide guide member 42 to gradually reversely extend the second elastic member 4 along the third slide guide section 221 (guide slot) to store energy (as shown in FIG. 7). Under such circumstance, a gradually increasing damping effect is provided for the sliding of the slide seat 2 (slide cover) so as to slow down the sliding speed of the slide seat 2 (slide cover). When the movable member 43 (roller) moves to the end of the oblique section 124 (maximum uncompressed position of the first elastic member 3), the damping effect reaches a maximum value (the maximum extended position of the second elastic member 4). Accordingly, before the slide cover (slide seat 2) is fully opened (the movable member 43 moves into the locating notch 1251 of the end section 125), an excellent end stage buffering effect is provided (as shown in FIG. 8). Therefore, at the end stage of the opening travel of the slide cover, an excessively high instantaneous speed is avoided so as to avoid improper impact to the relevant components. Accordingly, the possibility of damage of the components can be minimized.

Figure 9:
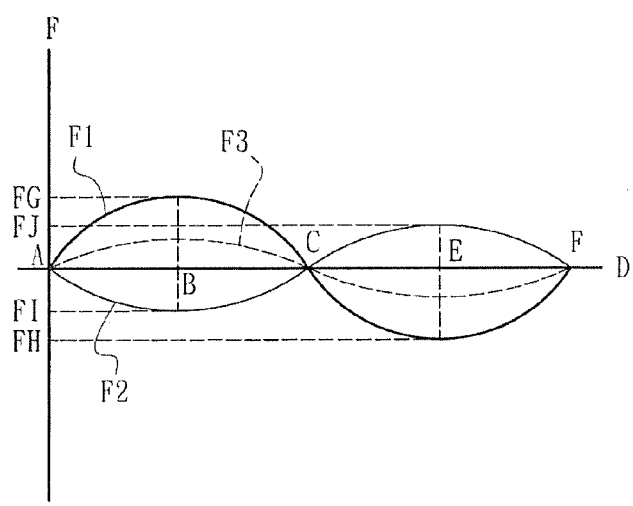
FIG. 9 is a curve diagram of the relevant action forces in operation of the present invention.

Please refer to FIG. 9, which is a curve diagram of the relevant action forces in operation of the present invention. In FIG. 9, the longitudinal axis represents action force F, while the transverse axis represents the travel D. Curve F1 is a curve of the original operational force necessary for the movement of the slide cover along the two oblique sections 122, 124 and the turning section 123 (overcome the elasticity of the first elastic member 3). Curve F2 is a curve of the action force applied to the slide cover (slide seat 2) by the second elastic member 4. Curve F3 is a curve of the actual operational force after curve F1 is offset by curve F2. In practice, according to curve F1 of the original operational force without taking the action force of the second elastic member 4 into consideration, at the former half stage of the process of opening the slide cover (from point A to point B), it is necessary to push the slide cover (slide seat 2) to compress the first elastic member for storing energy. Therefore, the applied force gradually increases. When the slide cover slides to the middle section (point B), the operational force reaches a maximum value FG. At the latter half stage of the process of opening the slide cover when the slide covers passes through the middle section (from point B to point C), the first elastic member 3 is gradually uncompressed (release energy) to help in pushing the slide cover (slide seat 2). Accordingly, the operational force gradually decreases until the slide cover is fully opened at point C where the operational force reaches a minimum value of the entire opening travel, that is, zero as shown in the diagram. Reversely, when closing the slide cover (from point C to point F), at the former half stage of the process of closing the slide cover (slide seat 2 from point C to point E), the reverse applied force gradually increases. When the slide cover slides to the middle section (point E), the operational force reaches a maximum value. At the latter half stage of the process of closing the slide cover when the slide the slide covers passes through the middle section (from point E to point F), the first elastic member 3 is gradually uncompressed (release energy) to help in pushing the slide cover (slide seat 2). Accordingly, the operational force gradually decreases until the slide cover is fully closed at point F where the operational force becomes zero. At this time, the opening and closing travel of the slide cover is completed. According to curve F2 of the action force of the second elastic member 4, the second elastic member 4 can provide a smaller reverse action force with the compression/uncompression of the first elastic member 3, (for example, a reverse force FI at point B and a reverse force FJ at point E), for offsetting part of the original operational force of curve F1. This results in a net force as shown by Curve F3 of the actual operational force. Accordingly, when opening the slide cover from the closed state or closing the slide cover from the opened state, an excellent buffering (damping) effect is provided to avoid impact to the slide cover due to excessively high speed. In this case, the possibility of damage of the relevant components can be minimized.

Figure 1A:
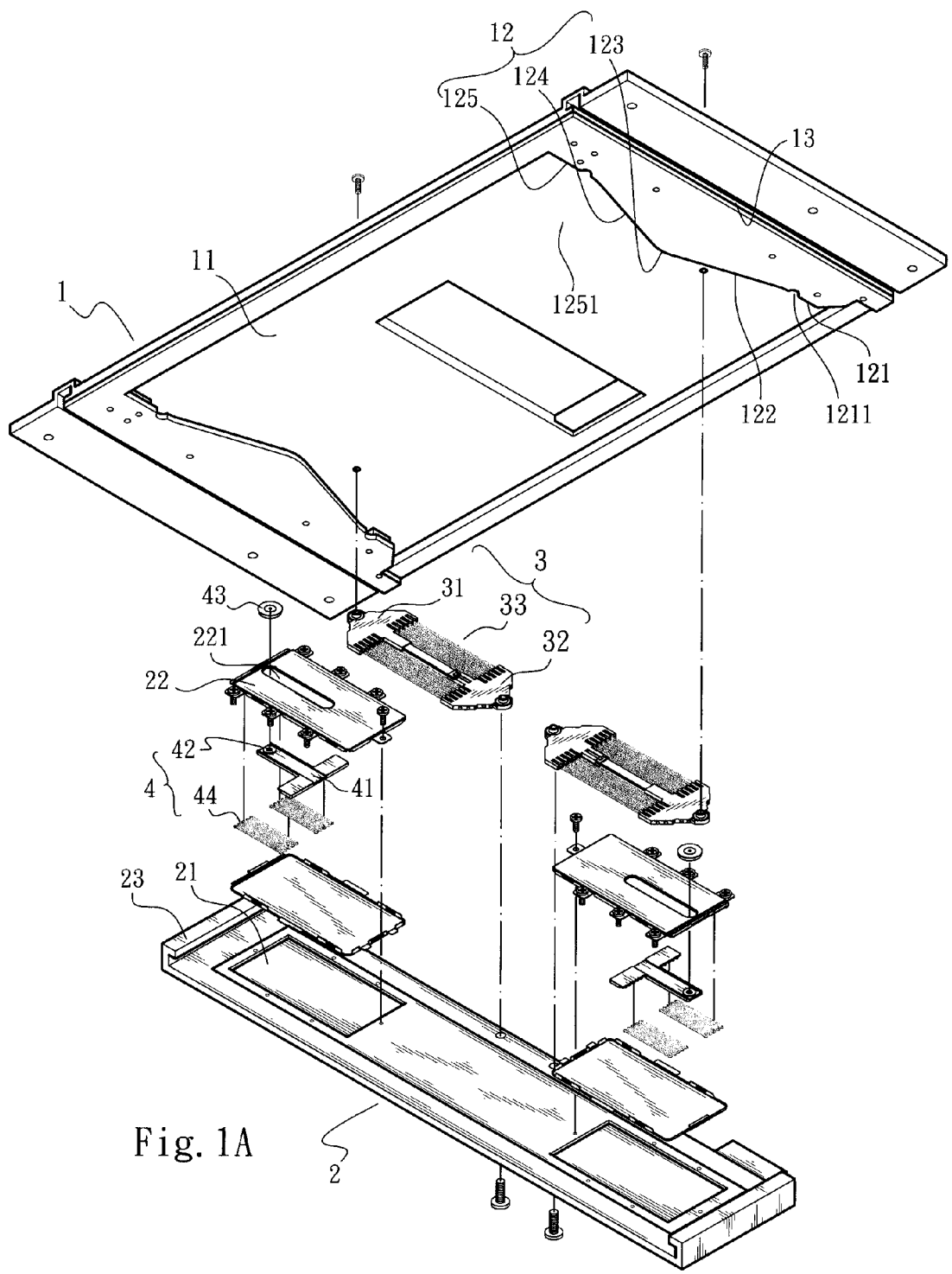
FIG. 1A is a perspective exploded view of an alternate embodiment of the present invention.

In the above embodiment, the turning section 123 of the slide seat 2 is in the form of an outward laterally turning section as shown in FIGS. 1 and 3-8 (for contracting the second elastic member 4). Alternatively, the turning section 123 of the slide seat 2 can have the form of an inward converging section as shown in FIG. 1A (for extending the second elastic member 4). Still alternatively, the two second slide guide sections 12 can apply an action force to the movable member 43 in a different direction and the second elastic member 4 pushes/pulls the slide cover in a direction in adaptation to the direction of the action force. Under such circumstance, the second elastic member 4 can equivalently provide a necessary elastic force to help in driving or damping the slide seat 2.

In conclusion, the slide cover linking mechanism with both push aid effect and end buffering effect of the present invention can truly provide a push strength saving and slide buffering/protection effect.

The above embodiments are only used to illustrate the present invention, not intended to limit the scope thereof. Many modifications of the above embodiments can be made without departing from the spirit of the present invention.

What is claimed is:

1. A slide cover linking mechanism with both push aid effect and end buffering effect, comprising:
    a seat body having a receiving space and at least one first slide guide section, at least one second slide guide section being disposed in the receiving space, a turning section being disposed at the middle of the second slide guide section;
    a slide seat bridged over the receiving space, the slide seat having at least one connection section for assembling with the first slide guide section, whereby the slide seat can slide over the receiving space along the first slide guide sections, the slide seat being formed with a receiving recess near the second slide guide section, a third slide guide section being disposed adjacent the receiving recess and extending toward the turning section;
    at least one first elastic member, a first end of the first elastic member being pivotally connected with a section in the receiving space near the turning section, a second end of the first elastic member being pivotally connected with a middle section of the slide seat, whereby the first elastic member serves to apply a force to the slide seat for driving the slide seat to slide toward two end sections of the second slide guide section; and
    at least one second elastic member for providing an elastic force smaller than that of the first elastic member in operation, a first end of the second elastic member being located in the receiving recess, a second end of the second elastic member being connected with a slide guide member slidable within the third slide guide section, a movable member being further pivotally connected on the slide guide member, the movable member being movable along the second slide guide section.

2. The slide cover linking mechanism with both push aid effect and end buffering effect as claimed in claim 1, wherein the first elastic member is composed of multiple springs and two elastic supports fitted with each other, first ends and second ends of the springs being respectively connected with the elastic supports.

3. The slide cover linking mechanism with both push aid effect and end buffering effect as claimed in claim 1, wherein the first slide guide section is a slide channel.

4. The slide cover linking mechanism with both push aid effect and end buffering effect as claimed in claim 1, wherein the second slide guide section is a lateral guide rail.

5. The slide cover linking mechanism with both push aid effect and end buffering effect as claimed in claim 1, wherein the third slide guide section is a guide slot.

6. The slide cover linking mechanism with both push aid effect and end buffering effect as claimed in claim 1, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

7. The slide cover linking mechanism with both push aid effect and end buffering effect as claimed in claim 6, wherein the first elastic member is composed of multiple springs and two elastic supports fitted with each other, first ends and second ends of the springs being respectively connected with the elastic supports.

8. The slide cover linking mechanism with both push aid effect and end buffering effect as claimed in claim 1, wherein said receiving recess is disposed on one side of the slide seat near the second slide guide section, an assembling member being connected in the receiving recess, said third slide guide section being disposed on the assembling member, the third slide guide section extending toward the turning section.

9. The slide cover linking mechanism with both push aid effect and end buffering effect as claimed in claim 8, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

10. The slide cover linking mechanism with both push aid effect and end buffering effect as claimed in claim 8, wherein the first elastic member is composed of multiple springs and two elastic supports fitted with each other, first ends and second ends of the springs being respectively connected with the elastic supports.

11. The slide cover linking mechanism with both push aid effect and end buffering effect as claimed in claim 8, wherein the first slide guide section is a slide channel.

12. The slide cover linking mechanism with both push aid effect and end buffering effect as claimed in claim 8, wherein the second slide guide section is a lateral guide rail.

13. The slide cover linking mechanism with both push aid effect and end buffering effect as claimed in claim 8, wherein the third slide guide section is a guide slot.

14. The slide cover linking mechanism with both push aid effect and end buffering effect as claimed in claim 1, wherein two locating notches are respectively disposed on two end sections of the second slide guide section, two oblique sections being respectively interconnected between the end sections and the turning section of the second slide guide section.

15. The slide cover linking mechanism with both push aid effect and end buffering effect as claimed in claim 14, wherein said receiving recess is disposed on one side of the slide seat near the second slide guide section, an assembling member being connected in the receiving recess, said third slide guide section being disposed on the assembling member, the third slide guide section extending toward the turning section.

16. The slide cover linking mechanism with both push aid effect and end buffering effect as claimed in claim 14, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

17. The slide cover linking mechanism with both push aid effect and end buffering effect as claimed in claim 14, wherein the first elastic member is composed of multiple springs and two elastic supports fitted with each other, first ends and second ends of the springs being respectively connected with the elastic supports.

18. The slide cover linking mechanism with both push aid effect and end buffering effect as claimed in claim 14, wherein the first slide guide section is a slide channel.

19. The slide cover linking mechanism with both push aid effect and end buffering effect as claimed in claim 14, wherein the second slide guide section is a lateral guide rail.

20. The slide cover linking mechanism with both push aid effect and end buffering effect as claimed in claim 14, wherein the third slide guide section is a guide slot.

21. The slide cover linking mechanism with both push aid effect and end buffering effect as claimed in claim 1, wherein the seat body has two first slide guide sections disposed on two sides of the receiving space, the two first slide guide section extending in parallel to each other.

22. The slide cover linking mechanism with both push aid effect and end buffering effect as claimed in claim 21, wherein two locating notches are respectively disposed on two end sections of the second slide guide section, two oblique sections being respectively interconnected between the end sections and the turning section of the second slide guide section.

23. The slide cover linking mechanism with both push aid effect and end buffering effect as claimed in claim 21, wherein said receiving recess is disposed on one side of the slide seat near the second slide guide section, an assembling member being connected in the receiving recess, said third slide guide section being disposed on the assembling member, the third slide guide section extending toward the turning section.

24. The slide cover linking mechanism with both push aid effect and end buffering effect as claimed in claim 21, wherein the first elastic member is composed of multiple springs and two elastic supports fitted with each other, first ends and second ends of the springs being respectively connected with the elastic supports.

25. The slide cover linking mechanism with both push aid effect and end buffering effect as claimed in claim 21, wherein two second slide guide sections are symmetrically disposed in the receiving space corresponding to the two first slide guide sections.

26. The slide cover linking mechanism with both push aid effect and end buffering effect as claimed in claim 25, wherein said receiving recess is disposed on one side of the slide seat near the second slide guide section, an assembling member being connected in the receiving recess, said third slide guide section being disposed on the assembling member, the third slide guide section extending toward the turning section.

27. The slide cover linking mechanism with both push aid effect and end buffering effect as claimed in claim 25, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

28. The slide cover linking mechanism with both push aid effect and end buffering effect as claimed in claim 25, wherein the first elastic member is composed of multiple springs and two elastic supports fitted with each other, first ends and second ends of the springs being respectively connected with the elastic supports.

29. The slide cover linking mechanism with both push aid effect and end buffering effect as claimed in claim 25, wherein two locating notches are respectively disposed on two end sections of the second slide guide section, two oblique sections being respectively interconnected between the end sections and the turning section of the second slide guide section.

30. The slide cover linking mechanism with both push aid effect and end buffering effect as claimed in claim 29, wherein said receiving recess is disposed on one side of the slide seat near the second slide guide section, an assembling member being connected in the receiving recess, said third slide guide section being disposed on the assembling member, the third slide guide section extending toward the turning section.

31. The slide cover linking mechanism with both push aid effect and end buffering effect as claimed in claim 29, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

32. The slide cover linking mechanism with both push aid effect and end buffering effect as claimed in claim 29, wherein the first elastic member is composed of multiple springs and two elastic supports fitted with each other, first ends and second ends of the springs being respectively connected with the elastic supports.

33. The slide cover linking mechanism with both push aid effect and end buffering effect as claimed in claim 1, wherein the turning section of the slide seat inward converges toward a center of the seat body.

34. The slide cover linking mechanism with both push aid effect and end buffering effect as claimed in claim 33, wherein two locating notches are respectively disposed on two end sections of the second slide guide section, two oblique sections being respectively interconnected between the end sections and the turning section of the second slide guide section.

35. The slide cover linking mechanism with both push aid effect and end buffering effect as claimed in claim 33, wherein the first elastic member is composed of multiple springs and two elastic supports fitted with each other, first ends and second ends of the springs being respectively connected with the elastic supports.

36. The slide cover linking mechanism with both push aid effect and end buffering effect as claimed in claim 33, wherein the first slide guide section is a slide channel.

37. The slide cover linking mechanism with both push aid effect and end buffering effect as claimed in claim 33, wherein the second slide guide section is a lateral guide rail.

38. The slide cover linking mechanism with both push aid effect and end buffering effect as claimed in claim 33, wherein the third slide guide section is a guide slot.

39. The slide cover linking mechanism with both push aid effect and end buffering effect as claimed in claim 33, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

40. The slide cover linking mechanism with both push aid effect and end buffering effect as claimed in claim 39, wherein the first elastic member is composed of multiple springs and two elastic supports fitted with each other, first ends and second ends of the springs being respectively connected with the elastic supports.

41. The slide cover linking mechanism with both push aid effect and end buffering effect as claimed in claim 33, wherein said receiving recess is disposed on one side of the slide seat near the second slide guide section, an assembling member being connected in the receiving recess, said third slide guide section being disposed on the assembling member, the third slide guide section extending toward the turning section.

42. The slide cover linking mechanism with both push aid effect and end buffering effect as claimed in claim 41, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

43. The slide cover linking mechanism with both push aid effect and end buffering effect as claimed in claim 41, wherein the first slide guide section is a slide channel.

44. The slide cover linking mechanism with both push aid effect and end buffering effect as claimed in claim 41, wherein the second slide guide section is a lateral guide rail.

45. The slide cover linking mechanism with both push aid effect and end buffering effect as claimed in claim 41, wherein the third slide guide section is a guide slot.

46. The slide cover linking mechanism with both push aid effect and end buffering effect as claimed in claim 1, wherein the turning section of the slide seat outward diverges toward lateral sides of the seat body.

47. The slide cover linking mechanism with both push aid effect and end buffering effect as claimed in claim 46, wherein two locating notches are respectively disposed on two end sections of the second slide guide section, two oblique sections being respectively interconnected between the end sections and the turning section of the second slide guide section.

48. The slide cover linking mechanism with both push aid effect and end buffering effect as claimed in claim 46, wherein the first elastic member is composed of multiple springs and two elastic supports fitted with each other, first ends and second ends of the springs being respectively connected with the elastic supports.

49. The slide cover linking mechanism with both push aid effect and end buffering effect as claimed in claim 46, wherein the first slide guide section is a slide channel.

50. The slide cover linking mechanism with both push aid effect and end buffering effect as claimed in claim 46, wherein the second slide guide section is a lateral guide rail.

51. The slide cover linking mechanism with both push aid effect and end buffering effect as claimed in claim 46, wherein the third slide guide section is a guide slot.

52. The slide cover linking mechanism with both push aid effect and end buffering effect as claimed in claim 46, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

53. The slide cover linking mechanism with both push aid effect and end buffering effect as claimed in claim 52, wherein the first elastic member is composed of multiple springs and two elastic supports fitted with each other, first ends and second ends of the springs being respectively connected with the elastic supports.

54. The slide cover linking mechanism with both push aid effect and end buffering effect as claimed in claim 46, wherein said receiving recess is disposed on one side of the slide seat near the second slide guide section, an assembling member being connected in the receiving recess, said third slide guide section being disposed on the assembling member, the third slide guide section extending toward the turning section.

55. The slide cover linking mechanism with both push aid effect and end buffering effect as claimed in claim 54, wherein the second elastic member is composed of multiple springs and a slide guide support, first ends of the springs being connected on the slide seat, second ends of the springs being connected on the slide guide support, the slide guide support being connected with the slide guide member, which can slide within the third slide guide section, the slide guide member being further pivotally connected with the movable member, which can move on the second slide guide section.

56. The slide cover linking mechanism with both push aid effect and end buffering effect as claimed in claim 54, wherein the first elastic member is composed of multiple springs and two elastic supports fitted with each other, first ends and second ends of the springs being respectively connected with the elastic supports.

57. The slide cover linking mechanism with both push aid effect and end buffering effect as claimed in claim 54, wherein the first slide guide section is a slide channel.

58. The slide cover linking mechanism with both push aid effect and end buffering effect as claimed in claim 54, wherein the second slide guide section is a lateral guide rail.

59. The slide cover linking mechanism with both push aid effect and end buffering effect as claimed in claim 54, wherein the third slide guide section is a guide slot.

\* \* \* \* \*